United States Patent [19]
Kudo et al.

[11] Patent Number: 5,956,719
[45] Date of Patent: Sep. 21, 1999

[54] SYNCHRONIZATION METHOD APPLIED TO DATABASES IN NETWORK MANAGEMENT SYSTEM

[75] Inventors: Miki Kudo; Akinori Kamijo; Masaharu Kamata; Keiji Mizuma; Yoshihiro Kozaki, all of Kawasaki, Japan

[73] Assignee: Fujitsu Limited, Kanagawa, Japan

[21] Appl. No.: 08/815,634

[22] Filed: Mar. 13, 1997

[30] Foreign Application Priority Data

Mar. 29, 1996 [JP] Japan ..................................... 8-075560

[51] Int. Cl.⁶ ..................................................... G06F 17/30
[52] U.S. Cl. ................................. 707/10; 707/8; 707/100; 707/201; 707/203; 395/200.31; 395/200.47; 395/200.5; 395/200.82
[58] Field of Search .................................. 707/8, 10, 100, 707/201, 203; 395/200.31, 200.47, 200.5, 200.82

[56] References Cited

U.S. PATENT DOCUMENTS

| | | | |
|---|---|---|---|
| 4,488,287 | 12/1984 | Carter et al. | 370/58 |
| 4,873,517 | 10/1989 | Baratz et al. | 340/825.03 |
| 5,113,499 | 5/1992 | Ankney et al. | 395/325 |
| 5,138,657 | 8/1992 | Colton et al. | 379/220 |
| 5,179,660 | 1/1993 | Devany et al. | 395/200 |
| 5,253,341 | 10/1993 | Rozmanith et al. | 395/200 |
| 5,289,372 | 2/1994 | Guthrie et al. | 364/403 |
| 5,384,768 | 1/1995 | Fujii | 370/14 |
| 5,408,526 | 4/1995 | McFarland et al. | 379/202 |
| 5,513,171 | 4/1996 | Ludwiczak et al. | 370/254 |
| 5,606,693 | 2/1997 | Nilsen et al. | 707/10 |
| 5,659,736 | 8/1997 | Hasegawa et al. | 707/100 |
| 5,680,609 | 10/1997 | Reinhardt | 707/10 |
| 5,729,735 | 3/1998 | Meyering | 707/10 |
| 5,742,820 | 4/1998 | Perlman et al. | 707/201 |
| 5,758,150 | 5/1998 | Bell et al. | 707/10 |
| 5,761,505 | 6/1998 | Golson et al. | 395/653 |

FOREIGN PATENT DOCUMENTS

| | | |
|---|---|---|
| 58-103039 | 6/1983 | Japan . |
| 59-165163 | 9/1984 | Japan . |
| 62-187931 | 8/1987 | Japan . |
| 62-236061 | 10/1987 | Japan . |
| 3-159436 | 7/1991 | Japan . |
| 4-24750 | 1/1992 | Japan . |
| 4-330552 | 11/1992 | Japan . |
| 4-332047 | 11/1992 | Japan . |
| 5-204739 | 8/1993 | Japan . |
| 7-23319 | 1/1995 | Japan . |

*Primary Examiner*—Thomas G. Black
*Assistant Examiner*—Jean R. Homere
*Attorney, Agent, or Firm*—Helfgott & Karas, P.C.

[57] ABSTRACT

A method of synchronization applied to databases of a network management system which establishes synchronization between a database of a managing system and a database of a managed system, and thereby facilitates the establishment of an initial database and reconfiguration of the same. The method (i) establishes a database based on a management information tree modeled on the system configuration for a network element NE forming a managed system, (ii) transfers an upper layer managed object instance information of the management information tree to an operation system OS of the managing system autonomously or by issuance of a command, (iii) starts, by the operation system OS of the managing system, the establishment of the database by the upper layer managed object instance data, (iv) demands, by this operation system OS, information of a lower layer managed object instance subordinate to the upper layer managed object instance, (v) sends, by the network element NE of the managed system, the lower layer managed object instance information to the managing system, and (vi) establish, by the managing system, the database using the thus sent information.

7 Claims, 11 Drawing Sheets

SYNCHRONIZATION METHOD APPLIED TO DATABASES IN NETWORK MANAGEMENT SYSTEM

BACKGROUND OF THE INVENTION

1. Field of the Invention

The present invention relates to a method of synchronization applied to databases in a network management system for establishing synchronization between a database of a managing system and a database of a managed system.

Network management can be classified into for example management of the configuration for managing the constituent elements of a network, management of faults for the detection, analysis, notification, and restoration etc, of faults, management of performance for managing response performance etc., management of security for preventing unauthorized access etc., and management of costs for managing the amount of use of lines etc. A variety of management methods have been already proposed in correspondence with the different sizes of networks etc. For example, a method of managing a network individually for each network element such as exchanges and multiplexers and a method of centrally managing a plurality of network elements are known, and generally such managements are achieved by setting up the databases independently.

In a network management system by treating network elements etc. as managed systems and by providing a managing system for centrally managing these managed systems, synchronizing processing becomes necessary for matching the content of the database set up in the managed system with the content in correspondence with the managed system set in the database of the managing system.

2. Description of the Related Art

Various methods have been already proposed as the method of synchronization for making the contents of a plurality of distributed databases consistent with each other. For example, there is a method in which, when a request is made for updating a database, that database is locked to reject requests for update and after the update of the database, the lock is released. In this method, however, the above mentioned lock is carried out every time the request for updating the database is generated, therefore there was a problem that the processing became complicate. Further, a method has been known in which a time stamp is given to every record in the database, the time stamp is referred to at the time of update of the database, and the update is performed using the record given the newest time stamp.

Further, there also exists a system in which a central computer and a remote computer each having its own database are connected by communication lines and records given time stamps are stored in each database. At the time of update of the database, a record having a newer time stamp in comparison with the time stamp contained in the request for update information for the database is read, this record is compressed to an update information file and transmitted, and this update information file is stored once in a buffer and then opened up in the database to perform the update processing (for example, refer to Japanese Unexamined Patent Publication No. 5-204739).

In the prior art method of synchronization of databases, a request for updating one database is generated in response to an update of another database in which the update of the former database is carried out in, for example, record units. In order to reduce the frequency of transfers of data in this case, in the related art, the transfer data was compressed to store into the file.

A system having a plurality of network elements such as exchanges and multiplexers is provided with a database for every network element and a managing system for managing these network elements as managed systems. The managing system has its own database storing the same content as the databases for each network element to operate and maintain the system.

Frequently, the network elements as managed systems are made by different manufacturers and are therefore different in configuration. Therefore, the content of the database for each network element as a managed system becomes different. Accordingly, the reconfiguration of the databases in the network elements become, due to the establishment of the database in the managing system and the reconfiguration of the database in the managing system, complex. This becomes a problem in the operation of the system.

SUMMARY OF THE INVENTION

Therefore, an object of the present invention is to construct databases having the same content in terms of logical configuration irrespective of the configuration of the managed system and thereby facilitate the processing for establishing and reconfiguring database in the managing system.

To attain the above object, the present invention provides a novel method of synchronization applied to databases of a network management system which establishes synchronization between a database of a managing system and a database of a managed system, and thereby facilitates the establishment of an initial database and reconfiguration of the same.

This method comprises (i) establishing a database based on a management information tree modeled (see FIG. 2) on the system configuration for a network element NE forming a managed system; (ii) transferring an upper layer managed object instance information of the management information tree to an operation system OS of the managing system autonomously or by issuance of a command; (iii) starting, by the operation system OS of the managing system, the establishment of the database by the upper layer managed object instance data, (iv) demanding, by this operation system OS, information of a lower layer managed object instance subordinate to the upper layer managed object instance; (v) sending, by the network element NE of the managed system, the lower layer managed object instance information to the managing system; and (vi) establishing, by the managing system, the database using the thus sent information.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Preferred embodiments of the present invention will now be described with reference to the related figures.

Figure 1:
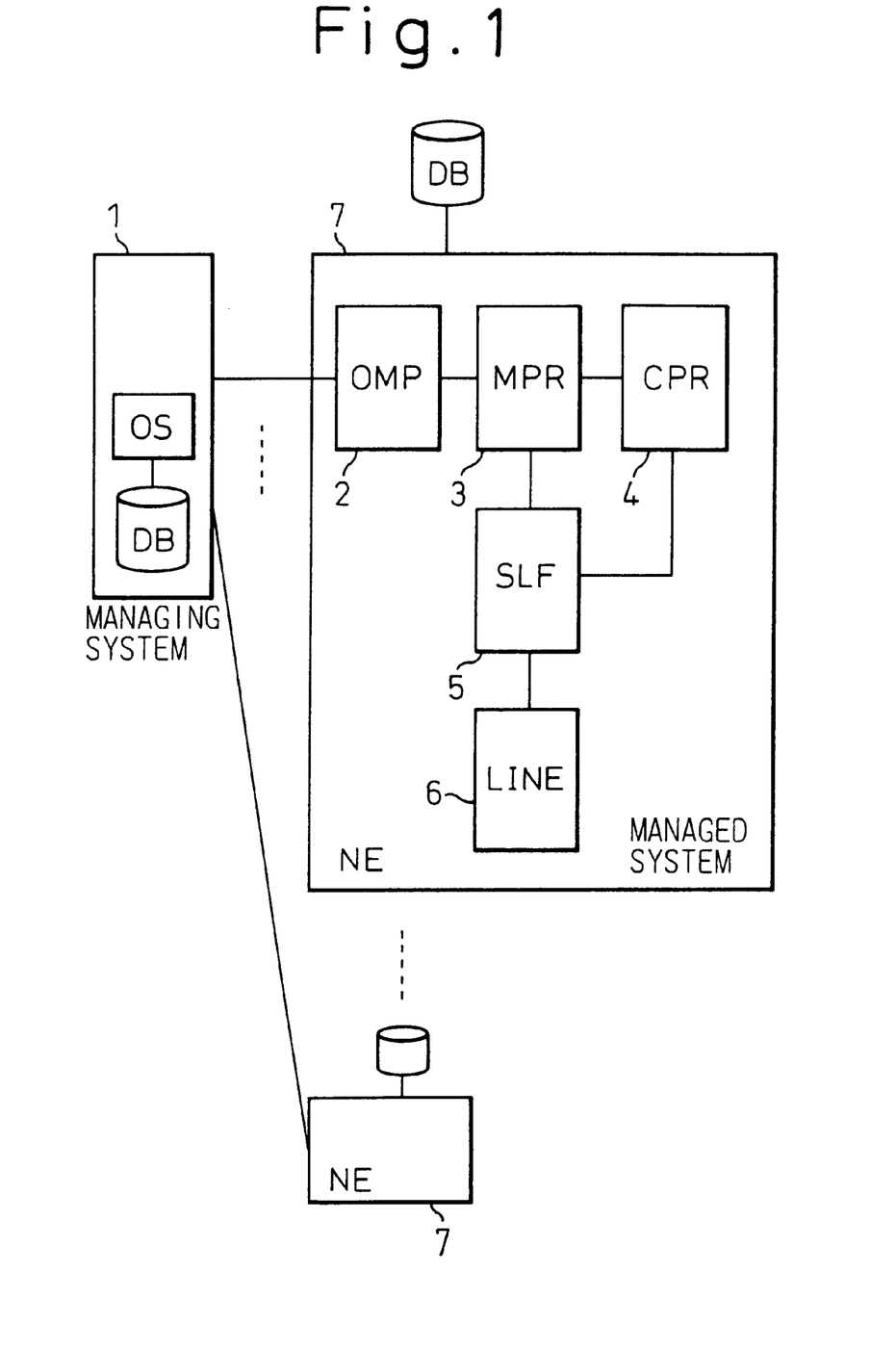
FIG. 1 is an explanatory view of an example of a system configuration to which the present invention is applied.

FIG. 1 is a view roughly explaining an example of a system configuration to which the present invention is applied, in which 1 denotes a managing system including an operation system, 2 an operation maintenance processor (OMP), 3 a main processor (MPR), 4 a call processor (CPR), 5 denote shelves (SLF), 6 a line, and 7 a network element (NE) treated as a managed system. Note that, a detailed example of the shelves will be explained later referring to FIG. 11.

A case is shown where the network element 7 in the managed system is an exchange performing switch connection by controlling, using the call processor 4, a speech path switch, not shown, for calls via the line 6 and transfers management information with the operation system OS in the managing system 1 via the operation maintenance processor 2. The operation system OS in the managing system 1 manages one network element (NE) 7 or a plurality of network elements 7.

Figure 2:
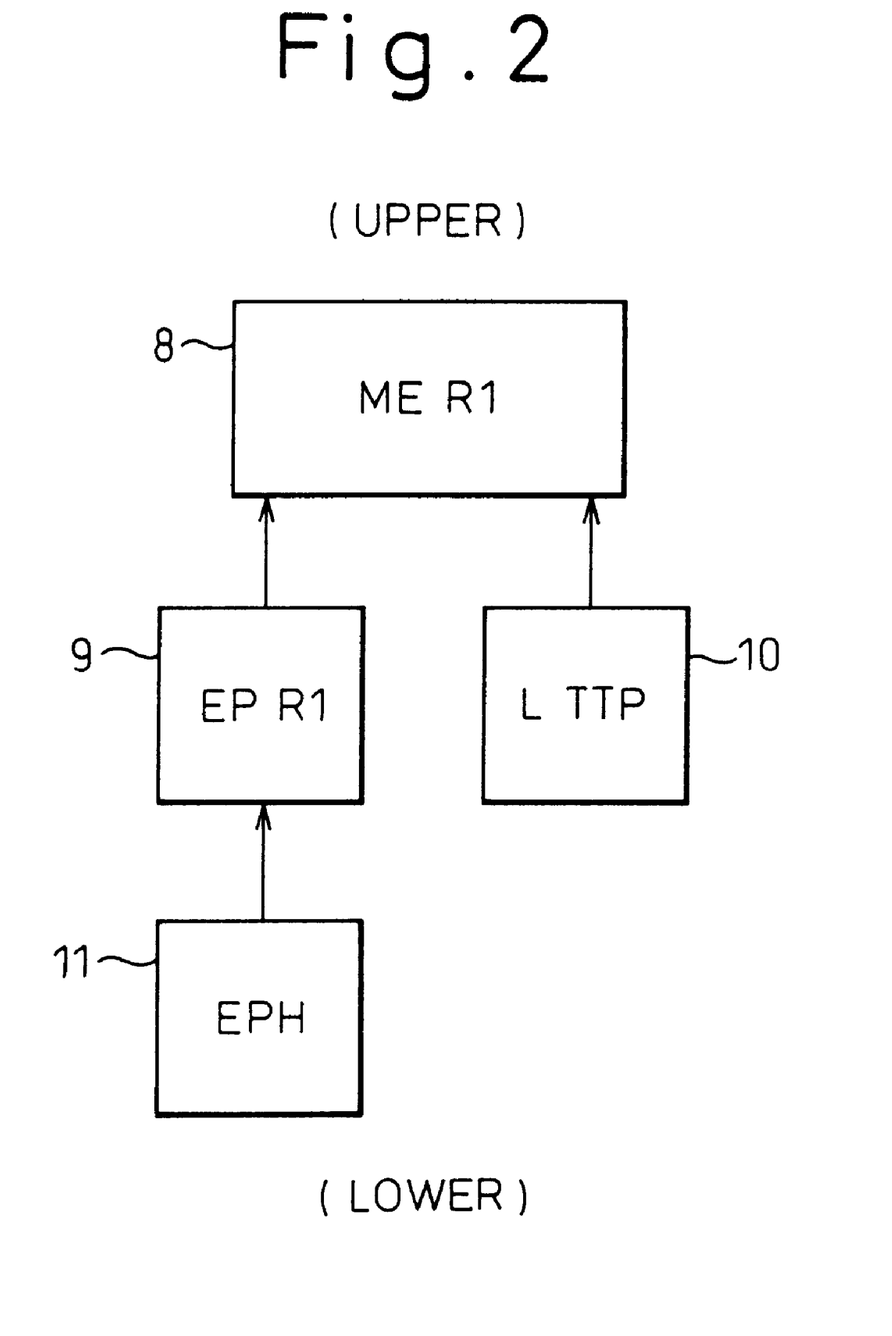
FIG. 2 is a view explaining an example of a management information tree or registration tree for each system adopted in the present invention.

FIG. 2 is a view explaining an example of a management information tree corresponding to the configuration of the systems (1, 7) adopted in the present invention. Reference numeral 8 denotes a managed element (MER1) for overall management of the network element 7, 9 equipment (EP R1) corresponding to the operation maintenance processor 2, main processor 3, and call processor 4 in FIG. 1, 10 a trail termination point (L TTP) which corresponds to the line 6 (FIG. 1) such as DS3 of for example 45 Mbps and terminates the line, 11 denotes an equipment holder (EPH) corresponding to the shelves 5 in FIG. 1, and the arrow indicates a direction toward the upper layer. Note that, R1 simply represents a version number and has no relation to the present invention.

As shown in FIG. 2, the system configuration is expressed in the form of a management information tree based on an OSI (open system interconnection) model or an SNMP (simple network management information protocol) model. With respect to the system configuration of FIG. 1, as shown in FIG. 2, the lower layer managed object instance in the managed element (ME R1) 8 is the equipment (EP R1) 9 including the processor etc. and the trail termination point (L TTP) 10 of lines. Further, the lower layer managed object instance of the equipment (EP R1) 9 is an equipment holder (EPH) 11 such as shelves. Accordingly, even in a case where the system configuration and the manufacturer of the systems are different, databases having logically the same management information tree configuration can be set up.

Accordingly, where each of the managing system and the managed system has a database and the managed system has a configuration of the network element 7 shown in FIG. 1, an initial database is set up in the form of the management information tree shown in FIG. 2. Synchronization processing is performed so that the content of that database and the content for each of the network elements 7 stored in the database in the managing system become equivalent. Further, where the managing system is formed by a distributed processing structure, instance information corresponding to the distributed processing functions are collected from the managed systems and each distributed managing system will establish a database for managing the managed systems.

Figure 3:
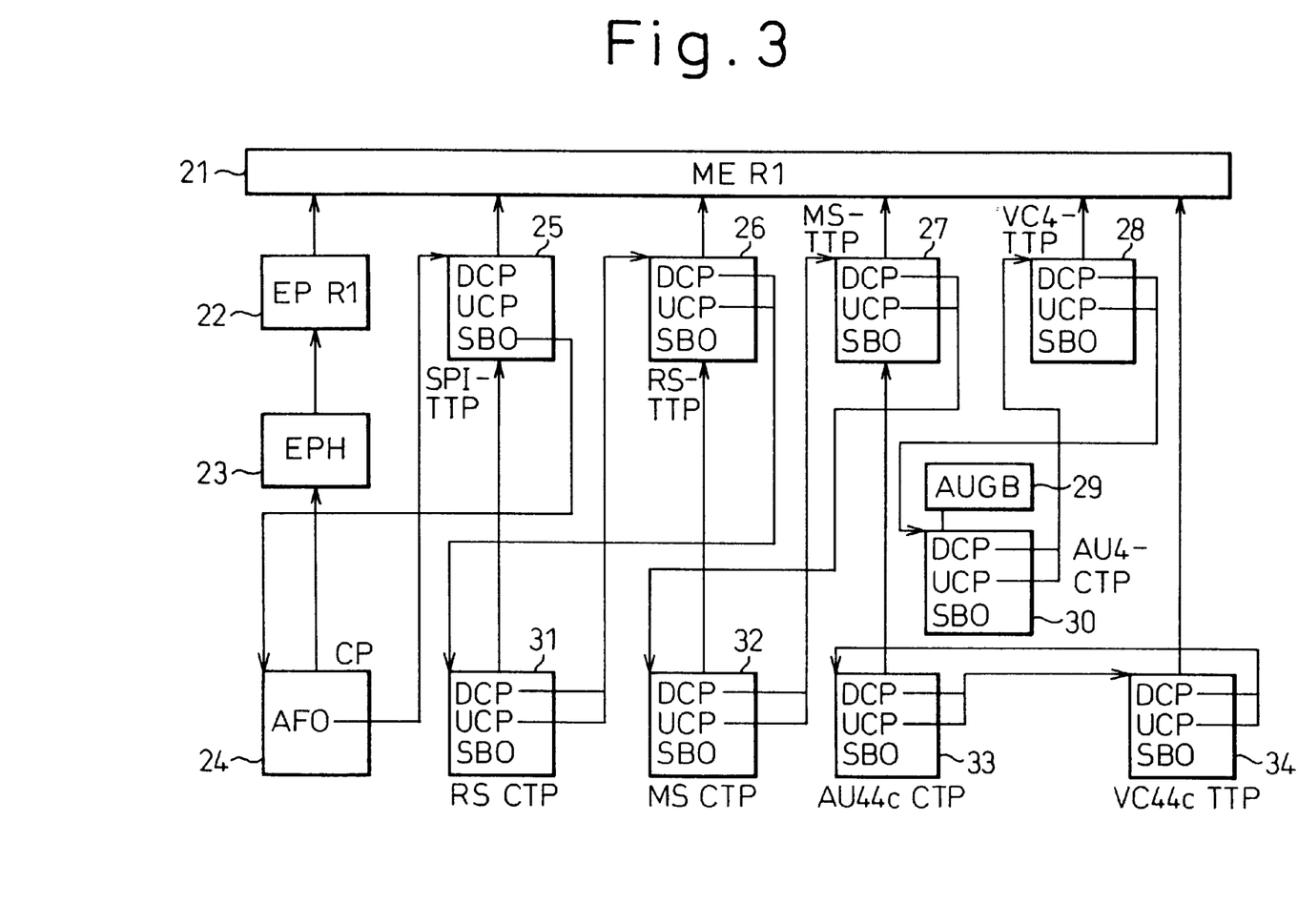
FIG. 3 is a view of an example of a logical management configuration of the database in an exchange system.

FIG. 3 is a view of an example of a logical management structure of a database in an exchange system and shows a relationship between objects (classes) managing both the state of arrangements and operating state of lines. The objects (instances) are managed based on this structure. In the figure, 21 is a managed element R1 (ME R1) for management including all hardware and functions to be managed as one exchange system and corresponds to the managed element (ME R1) 8 of FIG. 2. Further, 22 is equipment R1 (EP R1) inclusively managing the hardware and functions of one or more processors comprising one exchange system and corresponds to the equipment (EP R1) 9 of FIG. 2.

Further, 23 is an equipment holder (EPH) indicating the shelves for accommodating hardware such as processors and corresponds to the equipment holder (EPH) 11 of FIG. 2. Further, 24 denotes a circuit pack (CP) showing attributes and states of the device for controlling communication of signals and data for lines. AFO is an affected object list, whose attributes indicate the instance of the object (class) upon which the instance of that object (class) may directly exert some influence.

Reference numeral 25 denotes a point (optical synchronous physical interface TTP bidirectional; SPI TTP) physically terminating optical transmission lines, 26 a point (RS TTP bidirectional; RS TTP) terminating the control between devices amplifying the signal and data, 27 a point (MS TTP bidirectional; MS TTP) terminating the control between the devices multiplexing the signals and data, 28 a point (VC4 TTP bidirectional; VC4 TTP) terminating the communication of the signals and data of about 50 Mbps, and 29 management of a group of administrative units (AUG Bidirectional; AUGB).

Reference numeral 30 denotes management of administrative units of the signals and data of about 50 Mbps (AU4 connection termination point bidirectional: AU4 CTP), 31 a connection point (RS CTP bidirectional; RS CTP) of information controlled between the devices amplifying the signals and data, 32 a connection point (multiple section CTP bidirectional; MS CTP) of the information controlled between the devices multiplexing the signals and data, 33 management point (U44c CTP bidirectional; U44c CTP) of the signals and data of about 620 bps, and 34 a point (VC44c TTP bidirectional; VC44c TTP) terminating the communication of the signals and data of about 620 Mbps.

Further, SBO is an object list (supported by object list), whose attributes indicate that the instance of the object (class) is directly influenced by the objects (instances) pointed to by the attributes. Further, UCP is an upstream connectivity pointer and indicates the connection point and termination point of the signals and data in an upstream direction. Further, DCP is a downstream connectivity pointer and indicates the connection point and the termination point of the signals and data in a downstream direction. Further, the arrow indicates a direction from the object (class) of a lower layer toward the object (class) of the upper layer.

Next, the procedures for setting up a database concerning a line interface of about 620 Mbps will be explained.

(a) At the establishment of the managed system, instances of the objects (classes) of a managed element (ME R1) 21 and equipment (EP R1) 22 are generated in accordance with a model of the system configuration (FIG. 2).

(b) Further, the instance of the equipment holder (EPH) 23 is generated subordinate to the equipment (EP R1) 22.

(c) Further, the instance of the circuit pack (CP) 24 is generated subordinate to the instance of the equipment holder (EPH) 23 accommodating the circuit pack (CP) 24.

(d) Further, the instance of the termination point (SPI TTP) 25 is generated subordinate to the managed element (ME R1) 21, and the regeneration section connection point (RS CTP) 31 is generated subordinate to the termination point (SPI TTP) 25. At this time, for the connection with the instance of the corresponding circuit pack (CP) 24, the values are set so as to indicate the instance of the circuit pack (CP) 24 corresponding to the object list SBO of the termination point (SPI TTP) 25, and then indicate, for the object list AFO of the circuit pack (CP) 24, the instance of the corresponding termination point (SPI TTP) 25.

(e) Further, the instance of the termination point (RS TTP) 26 is generated subordinate to the managed element (ME R1) 21, and the instance of the connection point (MS CTP) 32 is generated subordinate to the termination point (RS TTP) 26. At this time, for bringing the instance of the termination point (RS TTP) 26 into correspondence with the instance of the corresponding connection point (RS CTP) 31, instances corresponding to the downstream point DCP and the upstream point UCP are set.

(f) Further, the instance of the termination point (MS TTP) 27 is generated subordinate to the managed element (ME R1) 21, and the management point (AU44c CTP) 33 is generated subordinate to the termination point (MS TTP) 27. At this time, for bringing the instance of the termination point (MS TTP) 27 into correspondence with the instance of the corresponding connection point (MS CTP) 32, instances corresponding to the downstream point DCP and the upstream point UCP are set.

(g) Further, the instance of the termination point (VC44c TTP) 34 is generated subordinate to the managed element (ME R1) 21. At this time, for bringing the instance of the termination point (VC44c TTP) 34 into correspondence with the instance of the corresponding management point (AU44c CTP) 33, instances corresponding to the downstream point DCP and the upstream point UCP are set.

By the above procedures, the initial database of the managed system is set up and notified to the managing system according to the procedures shown in FIG. 4 mentioned later and the database for each managed system is set up in the managing system. Note that, after the objects (instances) are once generated, the value of the point is set, but the value possessed by the attribute sometimes changes. In this case, a change of the attribution is notified to the managing system.

Further, in the instance of each object (class), a large number of attributes are managed. For example, referring to the termination point (MS TTP) 27, there are (1) an administrative state indicating the management state in maintenance and operation; (2) an operational state indicating a total operation state; (3) an alarm state indicating the highest level of the alarm being generated; (4) a current problem list showing alarms being generated; (5) an alarm severity assignment profile pointer indicating the instance defining the level and reason of the alarm; and (6) information for identifying the instance (MS TTP Id).

Further, as the value of the attribute, for the above (1) and (2), the value is assigned at the change of the state and the change of the state is notified from the managed system to the managing system. Further, for the above (3) and (4), at the generation of an alarm, an alarm is notified from the managed system to the managing system and, at the same time, the contents of the attributes are updated. Further, for the above (5), where the instance defining the level and reason of the alarm is altered, the alteration of the value of attribute is notified from the managed system to the managing system.

An explanation will be made below of the embodiments of the method of synchronization of a database of the present invention executed in the case of the system configuration and the logical management structure of the database explained above referring to FIG. 1 to FIG. 3.

Figure 4:
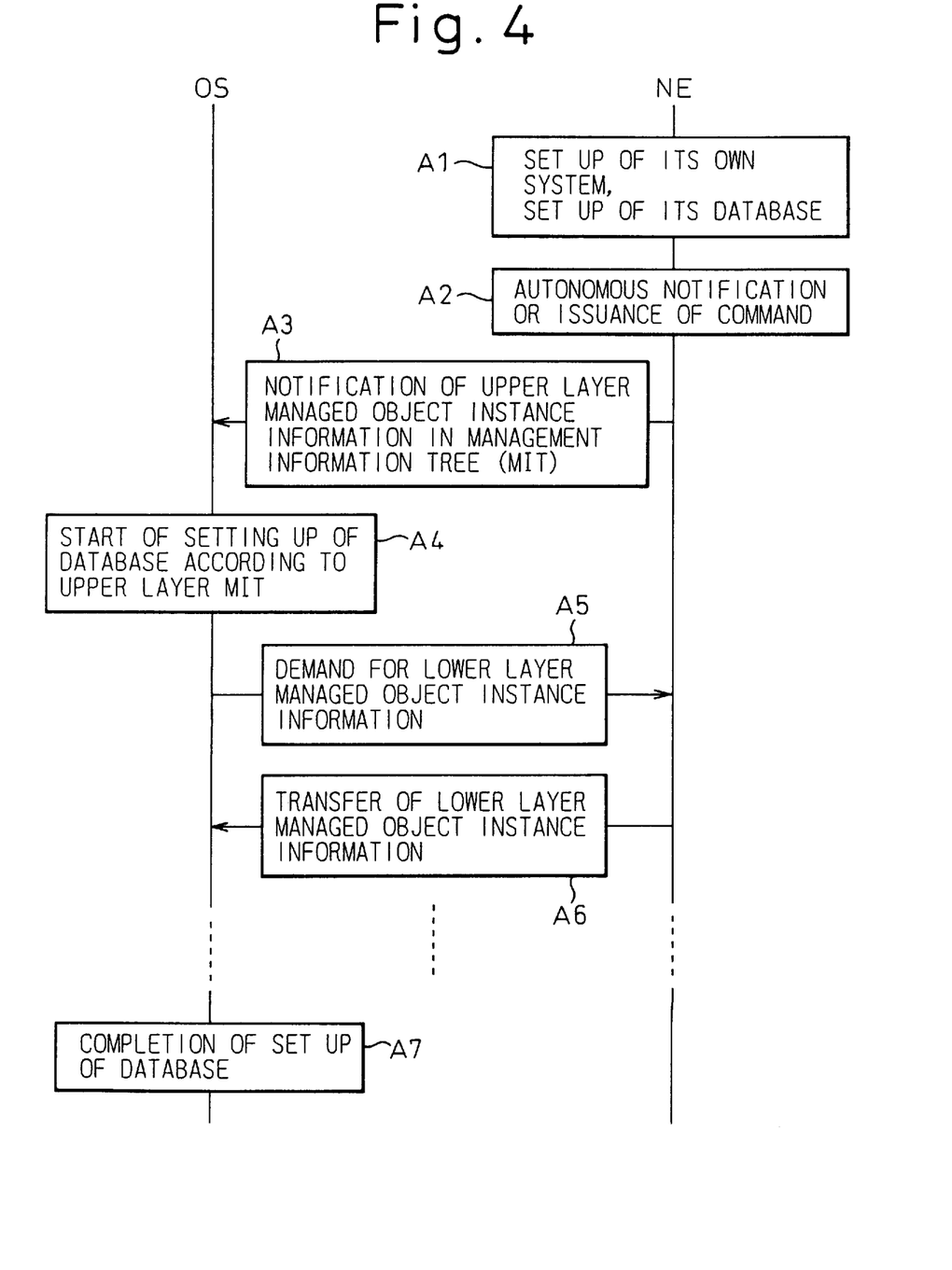
FIG. 4 is a view explaining the operation when establishing an initial database according to an embodiment of the present invention.

According to the present invention, there is provided a method of synchronization applied to databases in a network management system comprising a managing system and at least one managed system managed by the managing system, comprising the steps of: setting up, by the managed system, a database of a management information tree configuration modeled on the system configuration; transferring, from the managed system to the managing system, information of an upper layer hierarchy in the management information tree configuration so that the managing system may set up its own database; starting, by the managing system, a set up of its database based on the information of the upper layer hierarchy and demanding the information of a lower layer hierarchy sent from the managed system according to the information of the upper layer hierarchy; and transmitting, by the managed system, the information read from its database to the managing system in response to the demand by the managing system and setting up, by the managing system, the database in the lower layer in the previously set up management information tree configuration according to the information transmitted from the managed system (related to FIG. 4).

Figure 5:
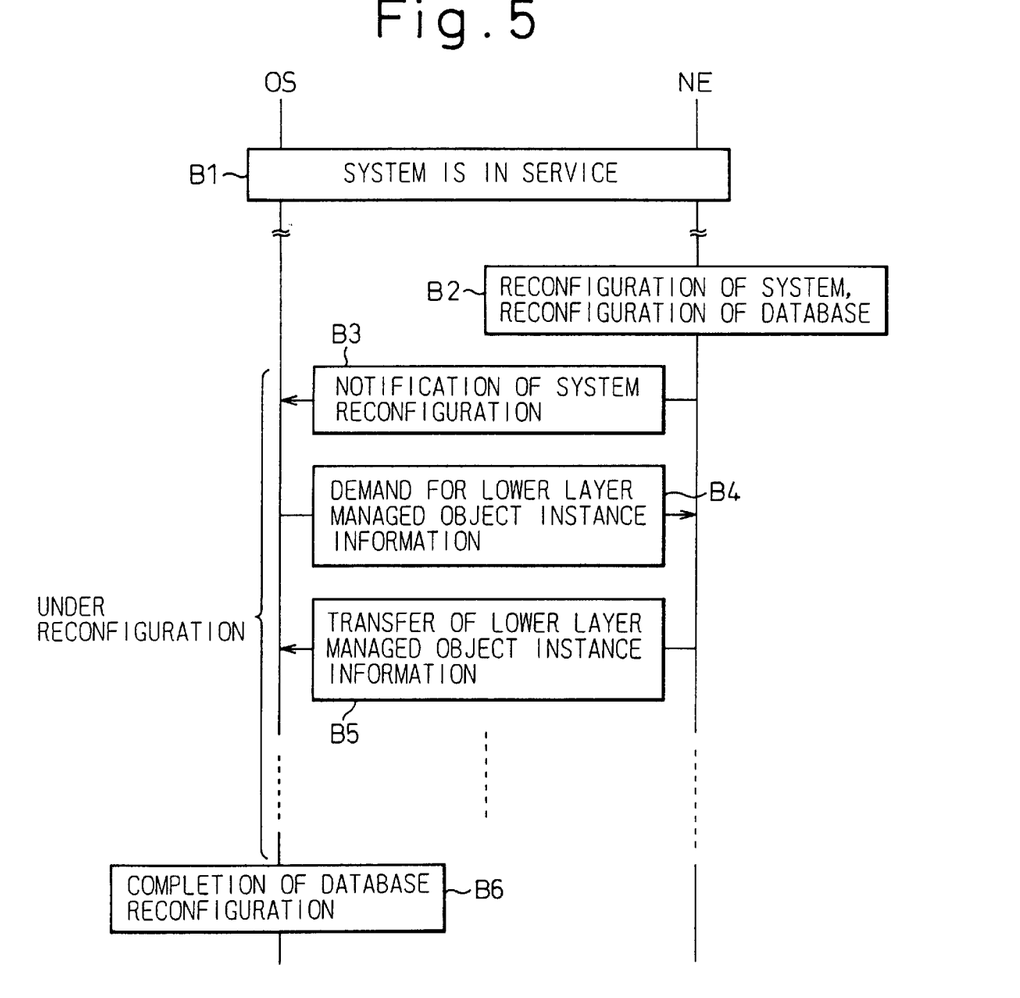
FIG. 5 is a view explaining the operation when reconfiguring a database in service according to an embodiment of the present invention.

The method of synchronization may further comprise, at the time when reconfiguring a database due to system reconfiguration of the managed system, the steps of: notifying, by the managed system, the above system reconfiguration to the managing system; demanding, by the managing system, the lower layer managed object instance information required due to the reconfiguration of the database in the managed system; transmitting, by the managed system, the lower layer managed object instance information read from its database to the managing system in response to the demand; and reconfiguring, by the managing system, its database based on the received lower layer managed object instance information (related to FIG. 5).

Figure 6:
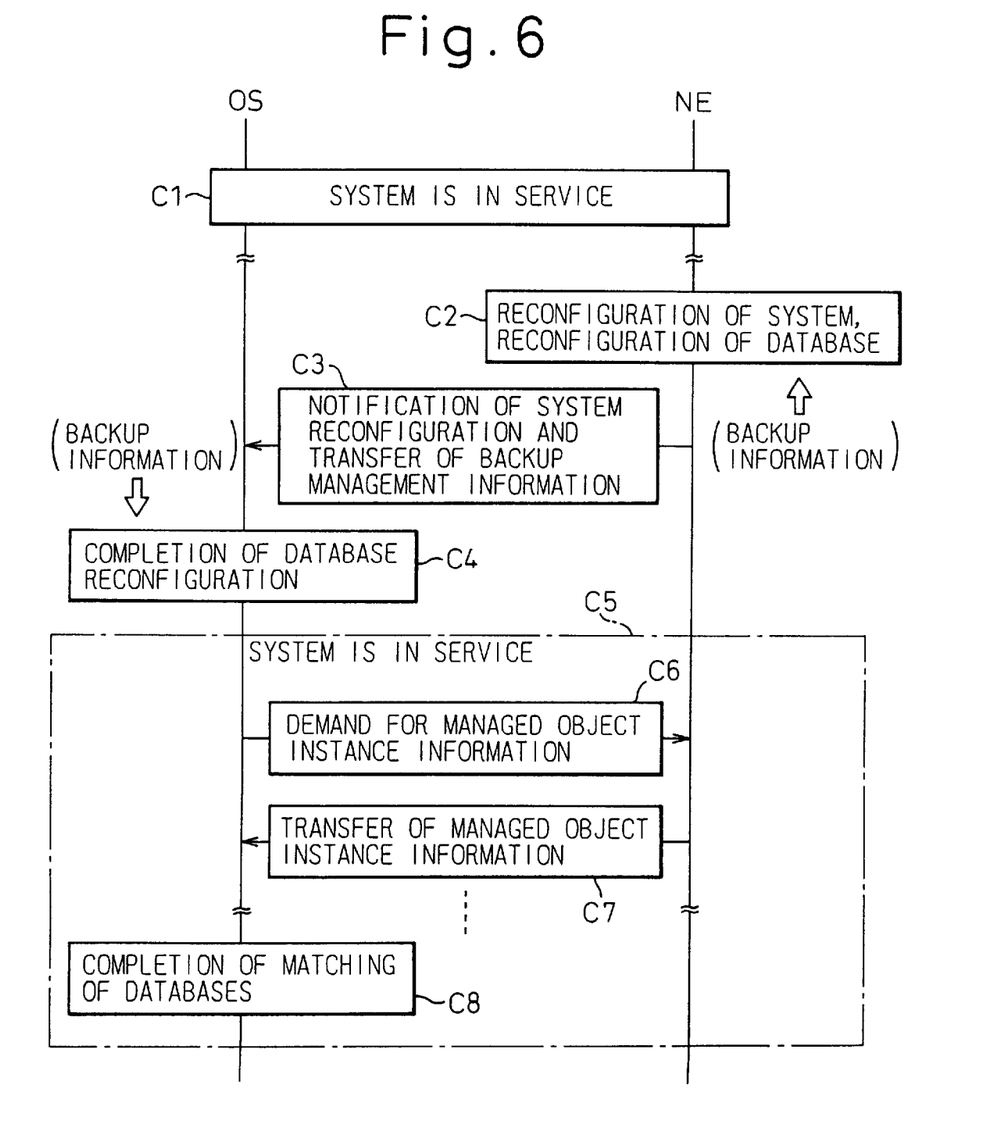
FIG. 6 is a view explaining the operation when reconfiguring a database by backup management information according to an embodiment of the present invention.

The method of synchronization may further comprise, at the time when reconfiguring a database due to system reconfiguration of the managed system, the steps of: notifying, by the managed system, the system reconfiguration and backup management information to the managing system; and reconfiguring, by the managing system, its database by using its own backup information referring to the backup management information (related to FIG. 6).

Figure 7:
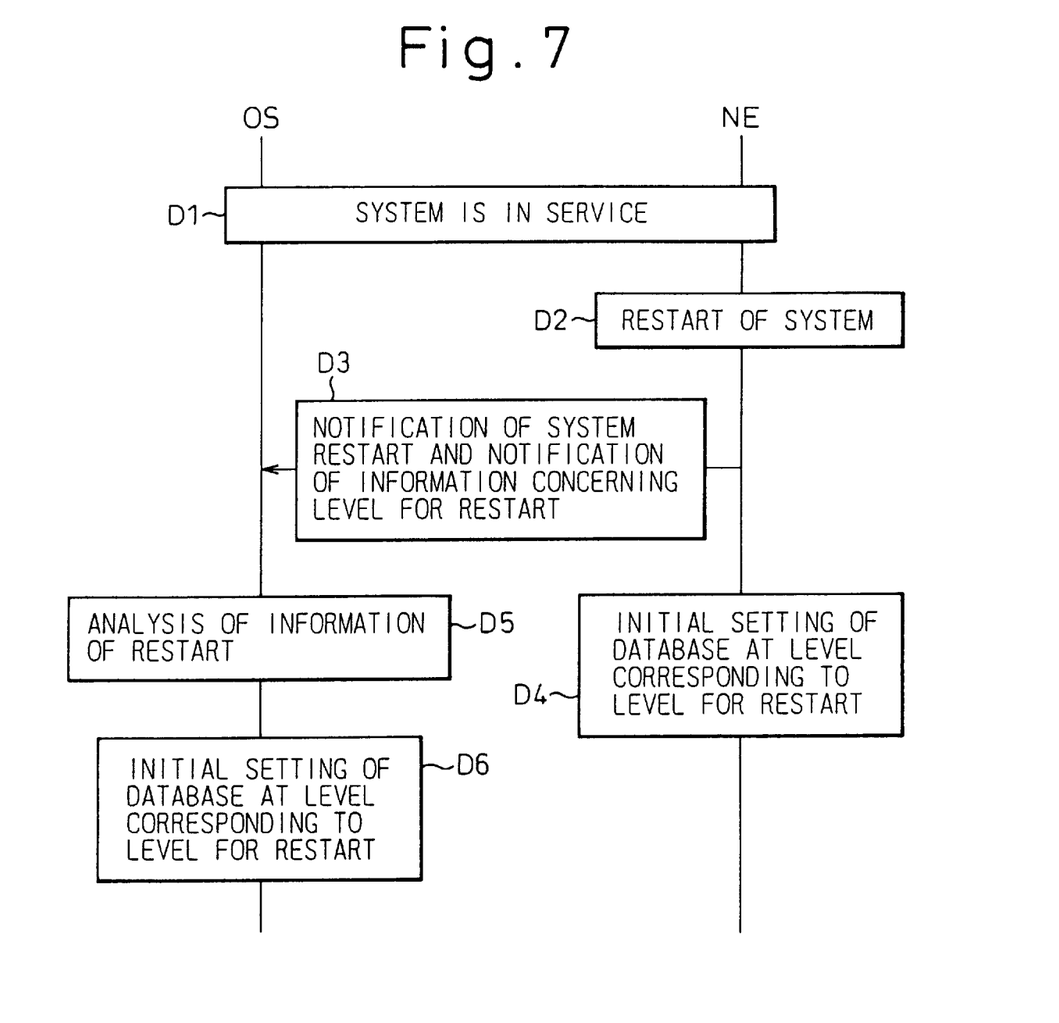
FIG. 7 is a view explaining the operation when restarting a system according to an embodiment of the present invention.

The method of synchronization may further comprise, at the restart of the system of the managed system, the steps of: initially setting, by the managed system, its database in correspondence with the restart level and notifying the managing system of the restart of the system and the restart level; and initially setting, by the managing system, its database in correspondence with the restart level (related to FIG. 7).

Figure 8:
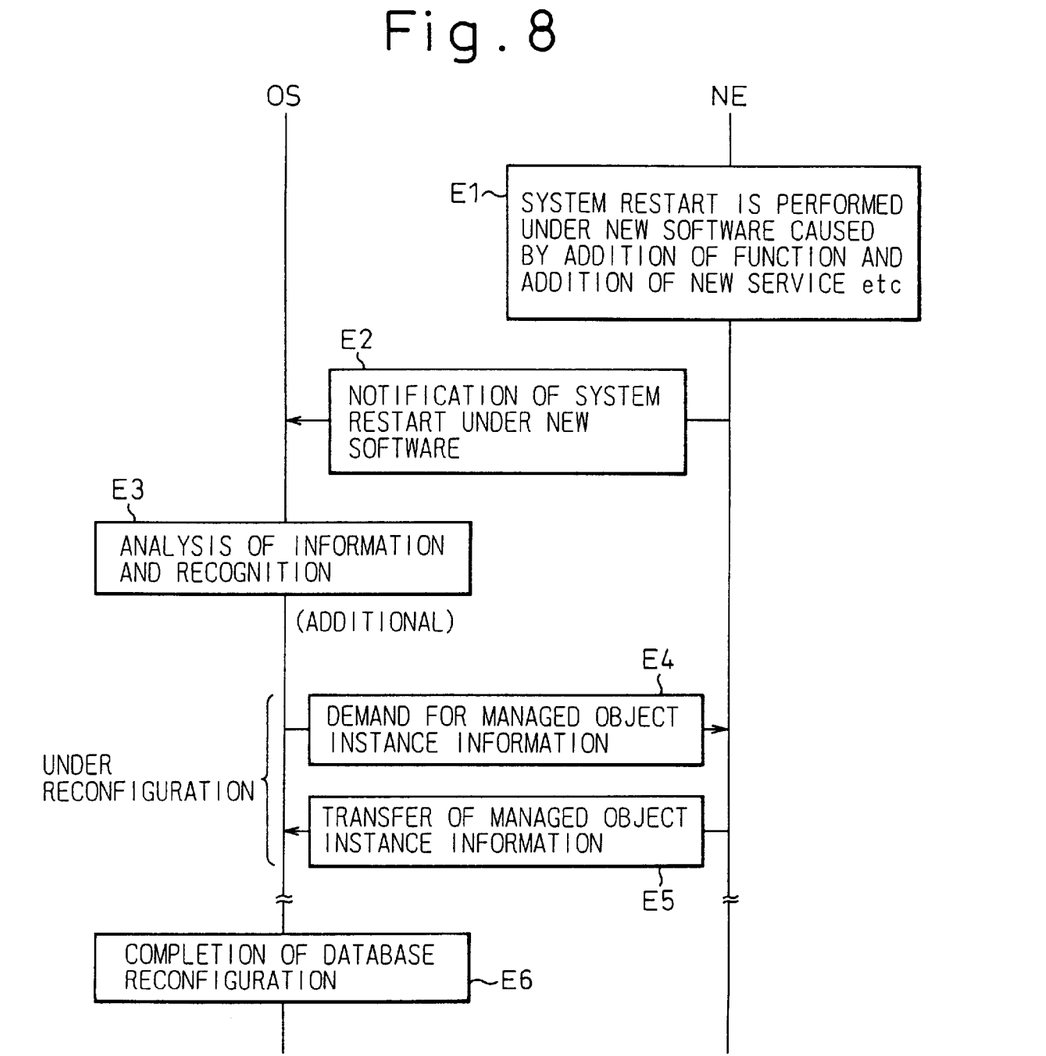
FIG. 8 is a view explaining the operation at the time of a shift over to new software according to an embodimentlof the present invention.

The method of synchronization may further comprise, at the restart of the system of the managed system by new software due to an addition of new functions etc. thereto, the steps of: reconfiguring, by the managed system, its database and notifying the managing system of the restart of the system by the new software; demanding, by the managing system, the lower layer managed object instance information in the management information tree configuration, sent from the managed system, corresponding to the addition of the new functions; transmitting, by the managed system, the lower layer managed object instance information read from its database to the managing system in response to the demand; and reconfiguring, by the managing system, its database based on the transmitted lower layer managed object instance information (related to FIG. 8).

Figure 9:
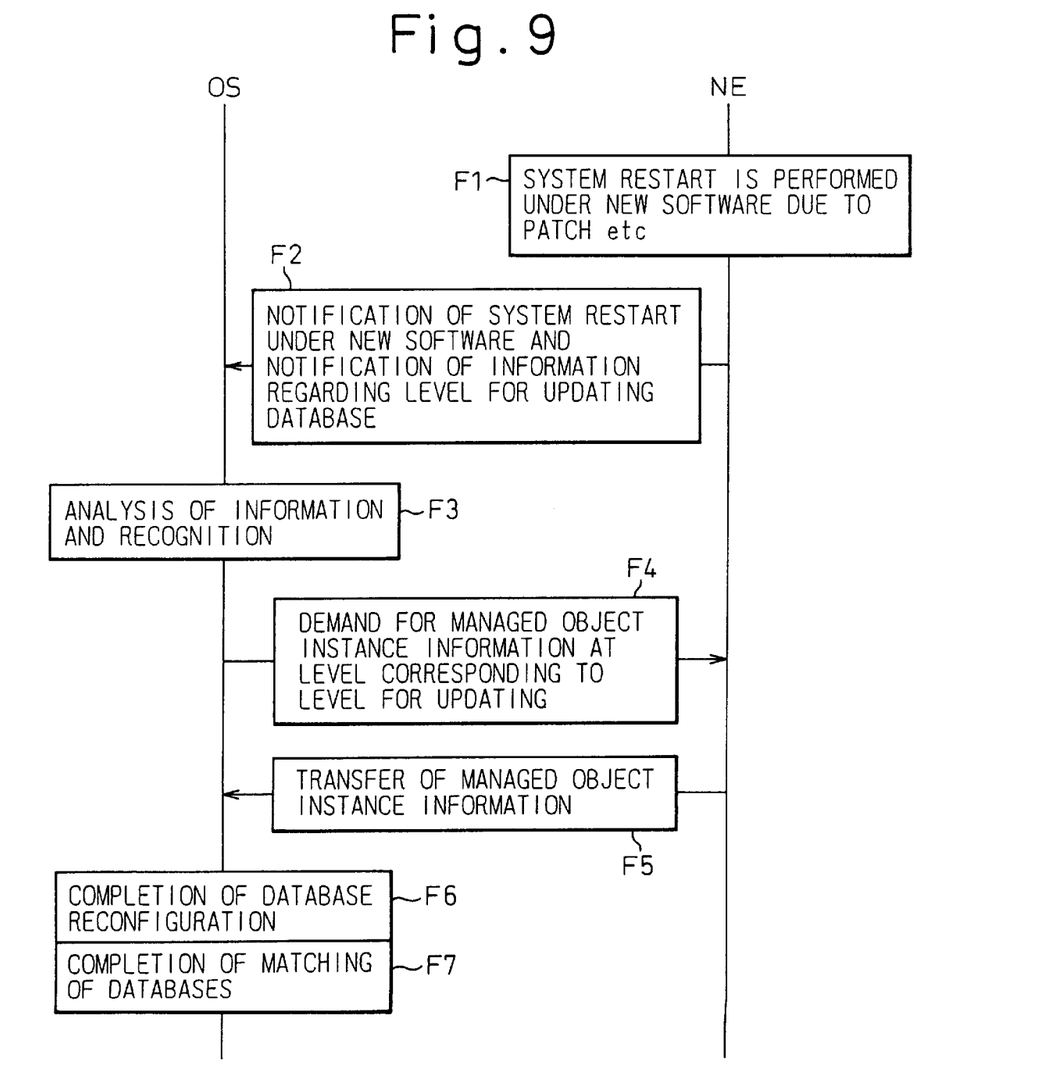
FIG. 9 is a view explaining the operation using a notification of an update level according to an embodiment of the present invention.

The method of synchronization may further comprise, at the restart of the system of the managed system by new software due to an upgraded version etc., the steps of: reconfiguring, by the managed system, its database and notifying the managing system of both the restart of the system by the new software and the update level of the database; demanding, by the managing system, the instance information, sent from the managed system, in correspondence with the update level; transmitting, by the managed system, the instance information read from its database to the managing system in response to that demand; and reconfiguring, by the managing system, its database based on the read instance information or matching up the databases (related to FIG. 9).

Figure 10:
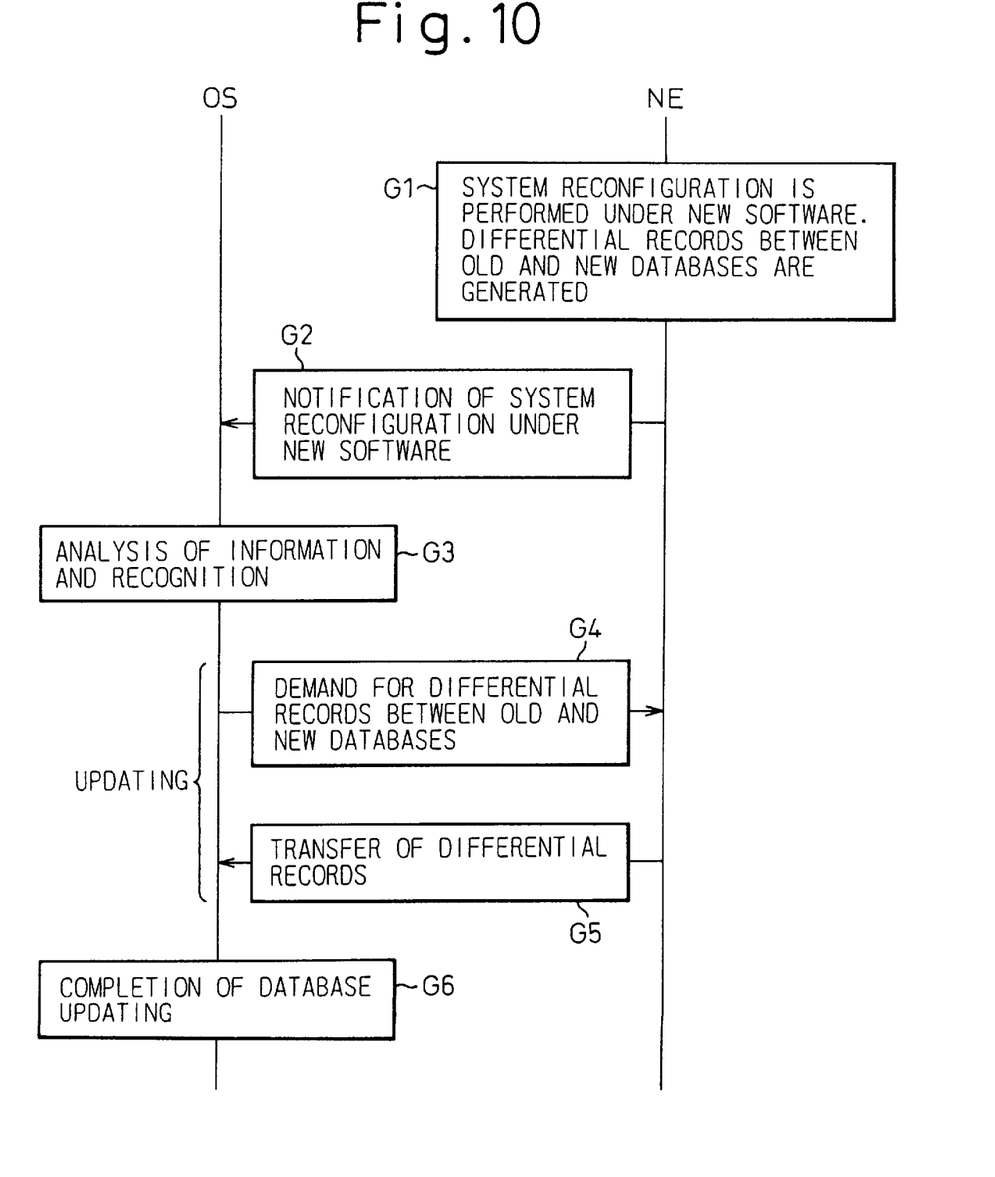
FIG. 10 is a view explaining the operation using differential records according to an embodiment of the present invention.

The method of synchronization may further comprise, at the restart of the system of the managed system due to a shift over to a new software, the steps of: reconfiguring, by the managed system, its database and notifying, to the managing system, of the restart of the system by the new software; demanding, by the managing system, differential records, sent from the managed system, in its database; seeking, by the managed system, for differential records between the new database and old database and transmitting the sought differential records to the managing system; and updating, by the managing system, its database based on the differential records (related to FIG. 10).

These aspects of the present invention will be explained in further detail next referring to the drawings.

FIG. 4 is a view explaining the operation when establishing an initial database according to an embodiment of the present invention and shows the operation system OS of the managing system and the network elements NE of the managed system. For example, the network elements NE having the configuration shown in FIG. 1 are set up and an initial database of the management information tree configuration obtained according to the system configuration model is set up (A1).

After this initial database is set up, the upper layer managed object instance information in the management information tree (MIT) is notified from the network elements NE to the operation system OS in the managing system autonomously or by issuance of a command (A2). In this case, the upper layer managed object instance information in the management information tree (MIT) at the least able to start the set up of each database, in the managing system, for each managed system, for example, the upper layer managed object instance information containing the managed element (ME R1) 8 of FIG. 2 or further containing also the equipment (EP R1) 9 is transmitted to the managing system (A3).

Note that, when the managing system is completed, the above upper layer managed object instance information is notified to the managing system autonomously or notified to the managing system by the issuance of a command when the database of the managed system is set up. When the managing system is also in the process of being set up, after the set up of the managing system, the upper layer managed object instance information with which it becomes possible to start the set up of the database is transmitted from the managed system to the managing system by the issuance of a command.

The managing system sets up the upper layer managed object instance information corresponding to the managed system in the database of the managing system based on the upper layer managed object instance information of the management information tree notified from the network elements NE in the managed system (A4). Further, a demand of the lower layer managed object instance information is transferred, which exists subordinate to the upper layer managed object instance and is required for management in the managing system to the network elements NE in the managed system (A5).

For example, when the managing system receives from the network elements NE of the managed system each upper layer managed object instance information of the managed elements (ME R1) 8 and the equipment (EP R1) 9 and processes the same as the upper layer managed object instance of FIG. 2, the managing system transmits a demand for the lower layer managed object instance information regarding the subordinate of the equipment (EP R1) 9 and transmits a demand for the lower layer managed object instance information regarding the subordinate of the managed element (ME R1) 8.

The managed system transmits for example the lower layer managed object instance read from the database of the managed system, that is, e.g., the equipment holder (EPH) 11 or termination point (L TTP) 10, in response to the demand for the lower layer managed object instance information from the managing system (A6). By repeating such processing, the lower layer managed object instance information in the managed system required in the managing system are collected and the database in the managing system corresponding to the managed system is set up (A7).

FIG. 5 is a view explaining the operation when reconfiguring a database in service according to an embodiment of the present invention and shows the network elements NE of the managed system and the operation system OS of the managing system. Here, when the operation of the system is in service (B1), the system is reconfigured due to occurrence of a fault in a network element NE of the managed system (B2). Here, the database of the network element NE will be reconfigured due to the reconfiguration of the system. In this case, the fundamental system configuration is not altered, therefore the upper layer managed object instance of the management information tree generally does not change from that before the reconfiguration.

The network element NE in the managed system autonomously notifies the managing system of the system reconfiguration after the reconfiguration of the database (B3). The operation system OS in the managing system demands the lower layer managed object instance information to send from the network element NE in response to the notification of reconfiguration from the network element NE since the upper layer managed object instance information in the management information tree of the network element NE is not altered (B4). The network element NE reads the lower layer managed object instance information from the reconfigured database in accordance with that demand and transmits it to the managing system (B5). By this, the database of the managing system can be reconfigured (B6).

FIG. 6 is a view explaining the operation when reconfiguring a database by backup management information according to an embodiment of the present invention. Here, when the operation of the system is in service (C1), a backup is periodically created in the database of the network element NE in the managed system and the database of the managing system. When a fault occurs in a network element NE, the system is reconfigured so that the operation of the system can be restarted when that fault is restored (C2). In this case, the database of the network element NE can be reconfigured by using the backup information in the network element NE.

Then, a notification of system reconfiguration and backup management information are transmitted from the network element NE to the managing system (C3). This backup management information contains the date and time information, version information, etc. for the backup information used at the reconfiguration of the database in the network element NE. The managing system analyzes the information notified from the network element NE of the managed system and reconfigures the database of the managing system by using the data corresponding to the backup management information contained in the backup information stored in the database of the managing system (C4).

Basically, synchronization is established between the database of the managing system and the database of the network element NE in the managed system so that the system can enter into service (C5). When the system is in service, the managing system issues a demand for instance information for confirming the content of the database of the network element NE in the managed system (C6). The network element NE reads the instance information corresponding to that demand from its database and transfers it to the managing system (C7). The managing system compares the instance information stored in its database and the instance information received from the network element NE and matches up the two databases (C8).

FIG. 7 is a view explaining the operation when restarting a system according to an embodiment of the present invention. The case is shown in which the level when restarting the system is determined and the initial setting corresponding to that level is determined in advance between the operation system OS in the managing system and the network element NE in the managed system. Here, when the system is in service (D1), the operation of a network element NE is temporarily suspended for a certain reason, and thereafter the cause is eliminated and then the system is restarted (D2). A notification of system restart and the restart level information are then sent to the managing system (D3).

The network element NE in the managed system initially sets the state of its database in correspondence with the level at the restart of the system (D4). On the other hand, the managing system analyzes the information of the restart from the network element NE (D5) and initially sets the state of the database in correspondence with the related restart level (D6). Namely, the notification of the restart level enables synchronization, after the restart of the system, between the database of the managed system and the database of the managing system.

FIG. 8 is a view explaining the operation at the time of a shift over to new software according to an embodiment of the present invention. The case is shown of the restart of the system under new software due to an addition of functions, addition of new services, etc. to a network element NE in the managed system (E1), whereupon the database is reconfigured to correspond with that new software. The managing system is notified of a system restart by the new software (E2).

The operation system OS in the managing system analyzes the information from the network element NE in the managed system and issues a demand to the network element NE for additional instance information due to the new software (E4). The network element NE reads the instance information from its database in response to that demand and transfers the same to the managing system (E5). By this, a reconfiguration is performed for the database of the managing system and thus a synchronization is established between the database of the managing system and the database of the managed system.

FIG. 9 is a view explaining the operation due to a notification of an update level according to an embodiment of the present invention. The case is shown in which when the system is restarted under new software due to a patch or the like with respect to a network element NE in the managed system (F1), the database of the network element NE is reconfigured in correspondence with the restart of the system. Then, a notification of the restart of the system under the new software and the update level of the database are transferred to the operation system OS in the managing system (F2).

The managing system analyzes and recognizes (F3) the above notified information (F2) and demands the instance information, to be sent from the network element NE, corresponding to the related update level for the database corresponding to the network element NE in the managed system (F4). The network element NE transfers the instance information read from its database to the managing system in response to that demand (F5).

The managing system reconfigures the database with the received instance information (F6) or compares the content of the database and that received instance information, detects non-coincidence, and makes the noncoinciding points match (F7). By this, the databases are synchronized to cope with the shift over to new software.

FIG. 10 is a view explaining the operation using differential records according to an embodiment of the present invention. The case is shown where a network element NE in the managed system generates differential records between the database of the old software and the database of the new software at the restart of the system under new software (G1). The network element then notifies the operation system OS in the managing system of the system restart under the new software (G2).

The managing system analyzes the notified information from the network element NE (G3) and demands the differential records to send from the network element NE (G4). The network element NE transfers the already prepared differential records to the managing system (G5). The managing system updates the database according to the differential records (G6). By this, the databases can be synchronized at the restart of the system under the new software. Note that, it is also possible to generate the differential records on line after notifying the managing system of the system restart.

Figure 11:
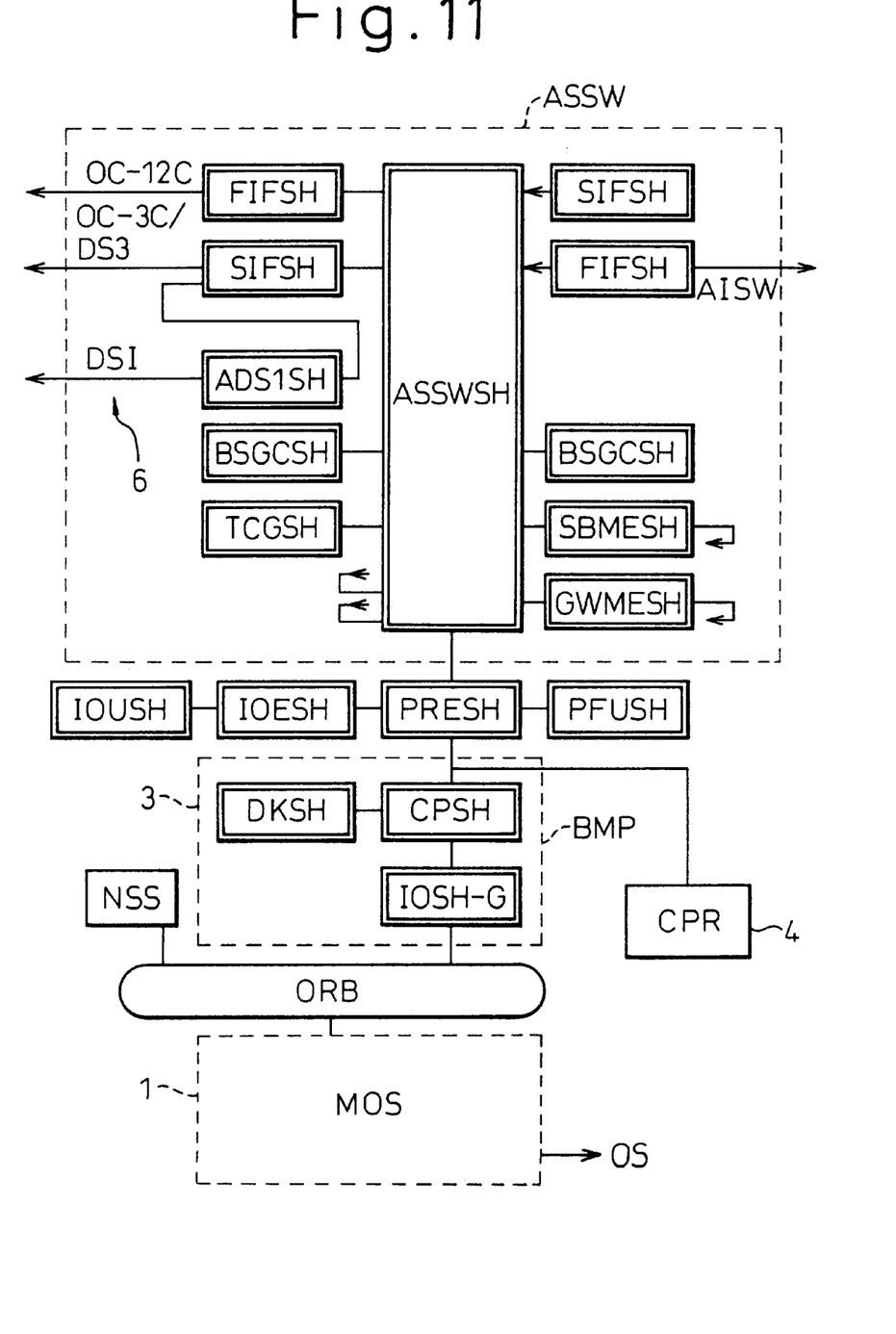
FIG. 11 is a view explaining the structure of shelves in an exchange system.

FIG. 11 is a view explaining the structure of shelves in the exchange system. In the figure, blocks shown by dotted lines indicate functional blocks, and blocks of double lines indicate the shelves. ASSW is an ATM subscriber switch, BMP is a broadband main processor, NSS is a narrow band switching system, ORB is an optical ring bus, MOS is a maintenance operation sub-system, AISW is an ATM interconnection switch, and OS is an operation system. The maintenance operation sub-system MOS corresponds to the above-mentioned managing system and manages the data names (shelf names—card names) of the portions in the tree configuration.

Further, FIFSH is a fiber interface shelf for OC-12C (622 Mbps) lines, SIFSH is a subscriber interface shelf connected to OC-3 (156 Mbps) lines or the DS3 (45 Mbps) lines, ADS1SH is an ATM DS1 shelf for the DS1 (1.5 Mbps) lines, BSGCSH is a wide band signaling group control shelf, TCGSH is a test call generating shelf, ASSWSH is an ATM switch shelf, SBMESH is a subscriber message handler shelf, and GWMESH is a gateway handler shelf.

Further, IOUSH, IOESH, PRESH, and PFUSH are shelves composing the wide band call processor. Further, DKSH composing the wide band main processor BMP is a magnetic disc shelf, CPSH is a system processor shelf, and IOSH-G is an interface shelf.

Each fiber interface shelf FIFSH in the ATM subscriber switch ASSW accommodates optical fibers of OC-12 (622 Mbps). Four ATM OC12C card groups OC12PGA-1 are provided in correspondence with this shelf FIFSH.

Further, the subscriber interface shelves SIFSH mounted in correspondence with OC-3C/DS3 are constituted by the ATM OC3-C card groups OC3CPGA-A and OC3CPGB-A in the case of OC-3C (156 Mbps). In the case of DS3 (45 Mbps), eight ATM DS3 card groups ADS3PGA-A, eight circuit emulation DS3 card groups CDS3PGA-A, eight frame relay DS3 card groups FDS3PGA-A are used in correspondence with each above shelf, and four ATM DSI card groups ADSINFA-A are used in correspondence with this shelf.

Further, the subscriber interface shelf ADS1SH mounted in correspondence with the DS1 (1.5 Mbps) lines is constituted by eight frame relay DS1 card groups FDS1PGA-A, eight SMDS DS1 card groups SDS1PGA-A, and eight circuit emulation DS1 card groups CDS1PGA-A are used in correspondence with each above shelf.

As explained above, it is possible to manage the system by setting the shelf names at the upper layer hierarchy, setting the card names composing each shelf at the lower layer hierarchy, and the setting up the database at the maintenance operation sub-system MOS.

As explained above, according to the present invention, when setting up an initial database cooperating with a managed system such as a network element etc., the managed system transfers the upper layer managed object instance information in the management information tree to the managing system to start setting up the database of the managing system and the managing system demands to send from the managed system the plural sets of lower layer managed object instance information required in its database according to the received upper layer managed object instance information, therefore there is the advantage that it is possible to set up the database, in the managing system, for each managed system by this.

Further, after setting up the initial database, during a reconfiguration of the database of the managed system performed due to a reconfiguration of the system, or during a reconfiguration performed due to a change to new software along with addition of functions or upgrading of versions, the managing system is notified of this fact and the lower layer managed object instance information is transferred or a differential record is transferred from the database of the managed system to the database of the managing system in response to a demand from the managing system. Alternatively, the restart level or backup management information is notified from the managed system to the managing system, and the database of the managing system can be reconfigured on the managing system side by setting the initial value in response to the restart level and setting backup information corresponding to the backup management information, so there is the advantage that an interruption of service of the system can be minimized.

What is claimed is:

1. A method of synchronization applied to databases in a network management system comprising a managing system and at least one managed system managed by the managing system, comprising the steps of:

setting up, by said managed system, a database of a management information tree configuration modeled on the system configuration;

transferring, from said managed system to said managing system, information of an upper layer hierarchy in said management information tree configuration so that said managing system may set up its own database;

starting, by said managing system, a set up of its database based on the information of said upper layer hierarchy and demanding the information of a lower layer hierarchy sent from said managed system according to the information of the upper layer hierarchy; and transmitting, by said managed system, the information read from its database to said managing system in response to the demand by the managing system and setting up, by said managing system, the database in the lower layer in the previously set up management information tree configuration according to the information transmitted from the managed system.

2. A method of synchronization applied to databases in a network management system according to claim 1, further comprising, at the time when reconfiguring a database due to system reconfiguration of said managed system, the steps of:

notifying, by said managed system, the above system reconfiguration to said managing system;

demanding, by said managing system, the lower layer managed object instance information required due to the reconfiguration of the database in said managed system;

transmitting, by said managed system, the lower layer managed object instance information read from its database to the managing system in response to the demand; and reconfiguring, by said managing system, its database based on the received lower layer managed object instance information.

3. A method of synchronization applied to databases in a network management system according to claim 1, further comprising, at the time when reconfiguring a database due to system reconfiguration of said managed system, the steps of:

notifying, by said managed system, the system reconfiguration and backup management information to said managing system; and reconfiguring, by said managing system, its database by using its own backup information referring to said backup management information.

4. A method of synchronization applied to databases in a network management system according to claim 1, further comprising, at the restart of the system of the managed system, the steps of:

initially setting, by said managed system, its database in correspondence with the restart level and notifying said managing system of the restart of the system and the restart level; and initially setting, by said managing system, its database in correspondence with the restart level.

5. A method of synchronization applied to databases in a network management system according to claim 1, further comprising, at the restart of the system of said managed system by new software due to an addition of new functions etc. thereto, the steps of:

reconfiguring, by said managed system, its database and notifying said managing system of the restart of the system by said new software;

demanding, by said managing system, the lower layer managed object instance information in the management information tree configuration, sent from said managed system, corresponding to said addition of the new functions;

transmitting, by said managed system, the lower layer managed object instance information read from its database to said managing system in response to said demand; and reconfiguring, by said managing system, its database based on the transmitted lower layer managed object instance information.

6. A method of synchronization applied to databases in a network management system according to claim 1, further comprising, at the restart of the system of said managed system by new software due to an upgraded version etc., the steps of:

reconfiguring, by said managed system, its database and notifying said managing system of both the restart of the system by the new software and the update level of the database;

demanding, by said managing system, the instance information, sent from said managed system, in correspondence with the update level;

transmitting, by said managed system, the instance information read from its database to said managing system in response to that demand; and reconfiguring, by said managing system, its database based on the read instance information or matching up the databases.

7. A method of synchronization applied to databases in a network management system according to claim 1, further comprising, at the restart of the system of said managed system due to a shift over to a new software, the steps of:

reconfiguring, by said managed system, its database and notifying, to said managing system, of the restart of the system by the new software;

demanding, by said managing system, differential records, sent from said managed system, in its database;

seeking, by said managed system, for differential records between the new database and old database and transmitting the sought differential records to said managing system; and updating, by said managing system, its database based on said differential records.

* * * * *